US012714974B2

(12) United States Patent
Dalhart

(10) Patent No.: US 12,714,974 B2
(45) Date of Patent: Aug. 25, 2026

(54) AIR GAP EDUCTOR INCLUDING A SWIVEL JOINT

(71) Applicant: Delaware Capital Formation, Inc., Wilmington, DE (US)

(72) Inventor: Mark Dalhart, Mason, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1269 days.

(21) Appl. No.: 17/371,251

(22) Filed: Jul. 9, 2021

(65) Prior Publication Data

US 2022/0016584 A1 Jan. 20, 2022

Related U.S. Application Data

(60) Provisional application No. 63/052,981, filed on Jul. 17, 2020.

(51) Int. Cl.
*B01F 25/312* (2022.01)
*B01F 25/00* (2022.01)

(52) U.S. Cl.
CPC .................. *B01F 25/31243* (2022.01); *B01F 25/312533* (2022.01); *B01F 25/31252* (2022.01); *B01F 2025/911* (2022.01); *B01F 2025/917* (2022.01)

(58) Field of Classification Search
CPC .......... B01F 25/31243; B01F 25/31252; B01F 2025/911; B01F 2025/917;
(Continued)

(56) References Cited

U.S. PATENT DOCUMENTS 244,446 A * 7/1881 Gilmore .............. F16L 27/0812 285/280
2,592,904 A * 4/1952 Jackson .................. B01F 27/90 261/87
(Continued)

FOREIGN PATENT DOCUMENTS

DE 3316233 A1 * 11/1984
DE 10107826 B4 * 8/2004
(Continued)

OTHER PUBLICATIONS

European Patent Office, Extended Search Report in EP21186489.7, Jan. 4, 2022.

*Primary Examiner* — Charles Cooley
(74) *Attorney, Agent, or Firm* — Fish & Richardson P.C.

(57) ABSTRACT

An eductor for mixing a diluent with a chemical. The educator includes an eductor body having a nozzle section with an inlet portion and an air gap portion, the inlet portion configured to couple to a diluent source and the air gap portion open to the atmosphere, and a venturi section coupled to the nozzle section. The nozzle section and venturi section may be connected by a swivel joint. The venturi section includes a venturi configured to couple to a chemical source for drawing chemical into the venturi with the flow of diluent through the venturi. A nozzle assembly positioned in the nozzle section of the eductor body. The nozzle assembly is selected from a plurality of nozzle assemblies each configured to be positioned in the nozzle section and operable with the eductor body, and each corresponding to a different volume flow rate through the eductor.

17 Claims, 11 Drawing Sheets

(58) Field of Classification Search
CPC ...... B01F 25/312521; B01F 25/312533; B01F 25/32; B01F 25/31242; B01F 2025/9171; B01F 25/312531; F16L 27/0812
USPC ......... 366/173.1, 174.1, 175.2, 181.8, 182.4, 366/182.2, 163.1, 163.2, 167.1, 176.1, 366/337, 181.5; 137/888–896; 239/1–754; 285/145.2, 147.1, 148.4, 285/275–276, 282
See application file for complete search history.

(56) References Cited

U.S. PATENT DOCUMENTS

| | | | | | |
|---|---|---|---|---|---|
| 2,879,083 | A * | 3/1959 | Corsette | F16L 27/0832 | 285/181 |
| 3,039,649 | A * | 6/1962 | Aleck | H02G 9/065 | 220/684 |
| 4,079,969 | A * | 3/1978 | Wilson | F16L 27/0816 | 285/98 |
| 4,130,247 | A * | 12/1978 | Healy | B05B 1/30 | 239/533.1 |
| 4,205,866 | A * | 6/1980 | McCracken | F16L 27/0832 | 285/94 |
| 4,478,435 | A * | 10/1984 | Cheshier | F16L 27/0808 | 285/918 |
| 4,478,438 | A * | 10/1984 | Elorriaga, Jr. | F16L 27/0812 | 285/94 |
| 4,557,261 | A * | 12/1985 | Rugheimer | A61M 16/0833 | 285/317 |
| 5,159,958 | A * | 11/1992 | Sand | E03C 1/046 | 137/896 |
| 5,253,677 | A * | 10/1993 | Sand | A47L 15/4427 | 137/896 |
| 5,518,020 | A * | 5/1996 | Nowicki | E03C 1/102 | 137/216 |
| 5,522,419 | A * | 6/1996 | Sand | B01F 25/31243 | 137/216 |
| 5,673,725 | A * | 10/1997 | Russell | E03C 1/102 | 417/198 |
| 5,775,741 | A * | 7/1998 | Rice | F16L 27/0832 | 285/272 |
| 5,862,829 | A * | 1/1999 | Sand | B01F 25/312 | 137/216 |
| 6,634,376 | B2 * | 10/2003 | Haas | F16K 7/075 | 137/853 |
| 7,063,357 | B1 * | 6/2006 | Bay | F16L 13/147 | 285/353 |
| 8,628,119 | B2 * | 1/2014 | Hasunuma | F16L 37/34 | 285/276 |
| 12,576,371 | B2 * | 3/2026 | Zieger | B01F 25/31242 | |
| 2001/0015231 | A1 * | 8/2001 | Sand | B01F 25/31243 | 137/40 |
| 2003/0127857 | A1 * | 7/2003 | Boyd | F16L 27/0812 | 285/330 |
| 2003/0155765 | A1 * | 8/2003 | Thomas | F16L 37/0985 | 285/305 |
| 2004/0050438 | A1 | 3/2004 | Hass | | |
| 2004/0052155 | A1 * | 3/2004 | Fabries | A01C 23/042 | 366/163.2 |
| 2006/0055171 | A1 * | 3/2006 | Parrott | F16L 37/53 | 285/276 |
| 2006/0260704 | A1 * | 11/2006 | Sand | B01F 25/31243 | 137/890 |
| 2007/0028980 | A1 * | 2/2007 | Lohr | B01F 25/312 | 137/216 |
| 2007/0176419 | A1 * | 8/2007 | Taillon | F16L 27/0812 | 285/275 |
| 2013/0099481 | A1 * | 4/2013 | Stempo | E04B 9/068 | 285/275 |
| 2020/0139277 | A1 * | 5/2020 | Rodriguez | B01D 24/38 | |
| 2022/0016584 | A1 * | 1/2022 | Dalhart | B01F 25/31243 | |

FOREIGN PATENT DOCUMENTS

| | | |
|---|---|---|
| WO | WO 1998037280 | 8/1998 |
| WO | 2015081330 A2 | 6/2015 |

* cited by examiner

AIR GAP EDUCTOR INCLUDING A SWIVEL JOINT

CROSS-REFERENCE TO RELATED APPLICATION

This application claims the benefit of and priority to U.S. Provisional Application No. 63/052,981 filed Jul. 17, 2020 (pending), the disclosure of which is incorporated by reference herein in its entirety.

TECHNICAL FIELD

This invention generally relates to chemical dispensing, and more particularly to venturi-based dispensers or proportioners, namely anti-backflow proportioners known as air gap eductors. The invention also relates to a method of manufacturing an air gap educator.

BACKGROUND

The dispensing of liquid chemical products into a receptacle is a common requirement of many industries. By way of example, in the janitorial industry it is often desirable to dispense one or more chemicals, such as detergents, bleaches, disinfectants, sanitizers, etc., for application to floors, countertops, and other surfaces and areas. Such chemicals may be mixed with water or other diluents to form a solution that is dispensed into a receptacle, such as a spray bottle or a bucket. In this regard, it is common to dispense concentrated chemical fluids by drawing them up through a venturi into a water stream and dispensing a flow of mixed water and chemicals. Mixers known as eductors accomplish this task by providing a water flow through a venturi section and drawing chemicals into the flow through a low-pressure orifice in the venturi section.

It is important to maintain the water source free of contamination. Accordingly, these systems are arranged to prevent chemicals from being drawn back into the water source, which may be a municipal water supply. This has been accomplished through the use of backflow preventors such as air gap eductors. In essence, such air gap eductors include a nozzle upstream of the venturi section for defining a stream of water flowing across an unobstructed gap in the eductor body prior to entering the venturi section. Upon any water shut down or pressure reversal in the water system, the water stream terminates, leaving a gap in the eductor between the nozzle and the venturi section where the chemical is otherwise first introduced into the system. There is thus no mechanism capable of transmitting chemical back to the nozzle or upstream to the water supply.

FIG. 1 is a cross-sectional view of a prior art air gap eductor 10 offered by Hydro Systems Company of Cincinnati, Ohio, assignee of the present application. The air gap eductor 10 includes a unitary eductor body 12 having an upper nozzle section 14 and a lower venturi section 16. The nozzle section 14 includes a diluent inlet portion 18 and an air gap portion 20 downstream of the inlet portion 18. The inlet portion 18 is configured to be coupled to a diluent source, such as a municipal water supply, through a suitable fitting such as a threaded connection. A nozzle 22 is disposed in the inlet portion 18 and is spaced from the venturi section 16 by a defined distance (e.g., set by regulatory code). The purpose of the nozzle 22 is to collimate the diluent flow into an organized laminar stream and to control the flow rate of the diluent through the eductor 10. For example, the nozzle 22 has an outlet 24, the size of which primarily determines the flow rate of diluent through the eductor 10. The air gap portion 20 includes a pair of openings or windows 26 in the eductor body 12 that exposes the diluent stream and the region between the nozzle 22 and the venturi section 16 to atmospheric pressure and allows for visual observation of the diluent stream across the gap during operation.

The venturi section 16 includes a main body 28 having a primary passageway 30 extending therethrough. A venturi body 32 extends from a side of the main body 28 and into the primary passageway 30 and includes a venturi 34 for introducing chemical into the diluent flow to form the solution. The presence of the venturi body 32 in the primary passageway 30 provides two potential flow paths for the diluent flow from the nozzle 22. The first flow path is through the venturi 34 in the venturi body 32 and the second flow path is through a bypass passageway 36 around the venturi body 32. The diluent flow in the first flow path is used to pick up chemical in the venturi 34, and the diluent flow in the second flow path is essentially excess diluent that is passed around the venturi and mixed with the solution of the venturi downstream of the venturi section 16 of the educator 10. The venturi 34 includes a venturi passageway 38 configured in such a manner as to generate a low-pressure region at some point along the passageway 34, i.e., with converging and diverging passageway portions, as is generally known in the art. The venturi passageway 38 includes an opening or orifice 40 at the upper end of the venturi body 32 to place the primary passageway 30 and the venturi passageway 38 in communication with each other. In this way, at least a portion of diluent from the diluent stream from the nozzle 22 may pass into the venturi 34.

The venturi section 16 of the eductor 10 further includes a chemical port 42 configured to be coupled to a chemical supply for providing chemical to the eductor 10. The chemical port 42 includes a suitable fitting, such as a threaded connection. The chemical port 42 includes a chemical passageway 44 in communication with the venturi passageway 38 of the venturi 34 at or near the low-pressure region of the venturi passageway 38. In this way, as diluent flows through the venturi 34 a vacuum is created in the low-pressure region to draw chemical into the diluent stream flowing through the venturi 34. The diluent and chemical flowing through the venturi 34 ultimately flow through a venturi outlet 46 downstream of the chemical port 42. As illustrated in FIG. 1, a shield 48 may be disposed in the primary passageway 30 upstream of the venturi body 32. The shield 48 is configured to minimize splashing (often referred to as "spitting") of diluent outside of the eductor body 12, such as through the windows 26, during operation of the educator 10.

The air gap eductor 10 further includes a dual tube arrangement 50 downstream of the eductor body 12 for mixing the diluent flows from the venturi 34 and the bypass passageway 36 and directing that flow to the receptacle, whether that be a spray bottle, bucket or other receptacle. The dual tube arrangement 50 includes an inner discharge tube 52 and an outer discharge tube 54. The inner discharge tube 52 includes an upper end coupled to the venturi outlet 46 which may be barbed to facilitate the coupling and includes a flood ring 56 disposed therein adjacent the upper end of the inner discharge tube 52. The purpose of the flood ring 56 is to create back pressure that facilitates an optimal pressure distribution in the venturi 34 for introducing chemical into the diluent flow. The outer discharge tube 54 includes an upper end coupled to an eductor outlet 58 at the lower end of the eductor body 12 which may be barbed to facilitate the coupling. As illustrated in FIG. 1, the eductor outlet 58 is generally disposed above the venturi outlet 46 such that the inner discharge tube 52 is disposed in the outer discharge tube 54. An upper portion of the outer discharge tube 54 carries the diluent flow from the bypass passage 36. The outer discharge tube 54 is typically longer than the inner discharge tube 52 such that a lower portion of the outer discharge tube 54 carries and mixes the solution (diluent plus chemical) from the venturi 34 and the diluent flow from the bypass passageway 36 prior to being dispensed in the receptacle.

Additional details of air gap eductors, such as those similar to that described above, may be found in U.S. Pat. Nos. 5,522,419 and 5,862,829, the disclosures of which are incorporated by reference herein in their entirety and owned by the present assignee.

While the air gap eductor 10 as described above operates well and for its intended purpose, there remain some drawbacks and challenges that manufacturers continually strive to improve upon. In this regard, air gap eductors as described above are very sensitive to misalignments between the nozzle 22 and the orifice 40 of the venturi 34. More particularly, misalignments between the nozzle 22 and the orifice 40 of the venturi 34 negatively impact the operation of the venturi 34 such that the proper amount of chemical may not be introduced into the venturi during operation. Accordingly, the solution that is dispensed into the receptacle may not meet applicable standards and be ineffective for its intended purpose (e.g., cleaning, sanitizing, etc.).

Additionally, misalignments between the nozzle 22 and the orifice 40 of the venturi 34 may increase the amount of splash and spitting during operation of the eductor 10. For example, when misaligned more and possibly higher velocity diluent from the nozzle 22 may contact parts of the shield 48 and create splash and mist that escape through the widows 26, which are typically immediately adjacent the shield 48 (e.g., see FIG. 1). The diluent from the spitting that escapes the eductor 10 typically ends up on the floor or wall of the facility and requires cleanup. This can be frustrating for janitorial staff and others using the eductor 10. To reduce the possibility of spitting, much effort goes into ensuring alignment between the nozzle 22 and the orifice 40 of the venturi 34. For example, the materials and manufacturing processes may be selected to have desirable properties (e.g., stiffness and high tolerances) to achieve good alignment and minimize spitting. However, this specialized attention to materials and processes to avoid misalignments increase the cost of the eductor 10.

Additionally, the eductor 10 lacks a certain amount of robustness in its design, and thereby inhibits straight forward scalability to multiple product offerings in the marketplace. More particularly, in janitorial applications it is typical to provide chemical dispensers, such as eductors 10, at different flow rates. This allows receptacles of different sizes to be filled quickly. By way of example, chemical dispensers like eductor 10 are generally commercially available at three different flow rates: 1 gallon-per-minute (gpm); 2.5 gpm; and 3.5 gpm. As noted above, the nozzle 22, and more particularly the nozzle outlet 24, generally determines flow rate through the eductor 10. In the current design, in order to maximize the dilution range for an eductor (i.e., the largest range of chemical amounts capable of being drawn in by the venturi 34), the orifice 40 of the venturi 34 is sized to be just slightly smaller than the size of the nozzle outlet 24. In other words, the venturi 34 is designed to use as much of the diluent stream as possible to draw chemical into the venturi 34 in order to maximize the dilution range of the eductor 10. Accordingly, the nozzle 22 and the eductor body 12 (including the venturi 34) are unique to the selected flow rate of the eductor 10.

From a manufacturing standpoint, this uniqueness in the design is inefficient and expensive. For example, either three different mold tools must be provided to produce the eductor bodies 12 for the three different flow rates, or a single, reconfigurable mold tool (e.g., with various slides, gates, etc.) must be provided to produce the eductor bodies 12 for the three different flow rates. In either case, the costs for the mold tools are relatively high. Additionally, costs associated with operation, maintenance, and up-keep of the multiple mold tools or reconfigurable mold tool may also be relatively high.

Furthermore, the dual tube arrangement 50 may also be unique to the flow rate of the eductor 10. In this regard, because the configuration of the venturi 34 of the eductor 10 changes depending on the selected flow rate, the size of the inner discharge tube 52 also changes to accommodate the different diluent flow through the venturi 34. Because of the concentric arrangement of the inner and outer discharge tubes 52, 54, the varying size of the inner discharge tube 52 may correspond to a variance in the size of the outer discharge tube 54. To accommodate the different tube sizes, manufacturers have to maintain stock of multiple tube types (i.e., inner discharge tube 52 (having the flood ring 56) and outer discharge tube 54) and multiple tube sizes. Moreover, service technicians performing maintenance on eductors 10 have to carry a wide range of inventory with them on service calls. These requirements on manufacturers and service technicians are also inefficient and expensive.

The airgap eductor 10 described above may lack robustness in other ways as well. In this regard, due to the strict alignment requirements between the nozzle 22 and the orifice 40 of the venturi 34, the eductor body 12 is typically formed as a unitary body of relatively stiff material. This essentially rigidly fixes the relative positions of the nozzle 22 and the orifice 40. However, this also fixes the relative position of the chemical port 42. In a typical installation, the chemical conduit from the chemical supply to the chemical port 42 has a fixed position relative to where the eductor 10 is to be positioned in the installation. However, when the eductor 10 is installed to the diluent supply connector, such as by the threaded connection in the nozzle section 14, and sufficiently tightened, the chemical port 42 may not align with the end of the chemical conduit to which it is to be attached. To address this, installers will typically under tighten or overtighten the eductor 10 to the diluent supply connector until the chemical port 42 is aligned to the chemical supply conduit. Such under or overtightening may cause leaking, damage the eductor 10, cause misalignments in the eductor 10, or otherwise decrease the operating life of the eductor 10. Alternatively, an installer may have to switch out a washer in the nozzle section 14 of the eductor 10, thereby effecting the engagement length of the threaded connection so that the chemical port 42 and the chemical supply conduit are aligned. Such a trial-and-error approach, however, is frustrating and time consuming for the installer, often prompting them to pursue the improper installation as described above.

The air gap eductor 10 as described above is an accepted backflow preventer in many countries and regions around the world. As described above, the air gap eductor 10 depends on a diluent source for supplying diluent at a sufficiently high pressure. This source is often the local municipal water supply at a location. The air gap eductors 10 are designed to work in an optimal manner at a selected operating pressure. For example, current air gap eductors 10 are designed around an operating pressure of about 40 psi and can operate reliably for a water pressure as low as 30 psi. However, the available water pressure in many places around the world may be below the design operating pressure and below the level at which the eductor 10 may reliably operate. Thus, there may be limitations in the current air gap eductor 10 that prevents its use in certain areas of the world.

In addition to the above, to address certain drawbacks of air gap eductors, other types of eductors have been developed. For example, another type of eductor for chemical dispensing applications is referred to as an e-gap eductor. An exemplary e-gap eductor is disclosed in U.S. Pat. No. 6,634,376, which is assigned to Hydro Systems Company and is incorporated by reference herein in its entirety. In an e-gap eductor, an elastomeric sleeve is positioned in the nozzle section to close off the windows in the eductor when water is flowing through the eductor and to open the windows when water stops flowing through the eductor. Accordingly, alignment tolerances and other design constraints may be loosened somewhat because the escape of diluent from the eductor, such as by spitting, is prohibited by the elastomeric sleeve.

While the e-gap eductor described above does overcome some challenges of air gap eductors, e-gap eductors are not as accepted by inspectors and regulatory bodies in countries and regions around the world. The primary reason for the reluctance of inspectors and regulatory bodies to approve e-gape eductors is the inability to visually observe diluent flow across the gap during operation (and thus no possibility of visualizing the prohibition of a potential reverse flow across the gap and into the water source). In other words, there is no visual proof that the eductor is operating as a back-flow preventer that prevents the contamination of the municipal water supply by the chemicals being used with the eductor. Accordingly, e-gap eductors have had as of yet limited applicability in the marketplace.

In view of the above, there is a need for an improved air gap eductor that addresses the shortcomings of current air gap eductors and e-gap eductors. More particularly, there is a need for an air gap eductor that is more robust in its overall design so as to be less sensitive to misalignment errors, include a single design usable over a range of flow rates, be manufactured in an efficient and cost-effective manner, and be usable at lower operating pressures.

SUMMARY

Embodiments of the present invention are directed to an educator for mixing a diluent with a chemical. The eductor includes an eductor body having a nozzle section with an inlet portion and an air gap portion, the inlet portion configured to couple to a diluent source and the air gap portion open to the atmosphere, and a venturi section coupled to the nozzle section. The venturi section includes a venturi configured to couple to a chemical source for drawing chemical into the venturi with the flow of diluent through the venturi. The eductor further includes a nozzle assembly positioned in the nozzle section of the eductor body, wherein the nozzle assembly is selected from a plurality of nozzle assemblies each configured to be positioned in the nozzle section and operable with the eductor body, and wherein each of the plurality of nozzle assemblies corresponds to a different volume flow rate through the eductor.

In one embodiment, the nozzle section and the venturi section of the eductor body may be coupled by a swivel joint that permits relative rotations between the two sections. At least one of the nozzle section and the venturi section, and preferably each of the sections, may be formed as a unitary body. The nozzle assembly includes a nozzle defining a nozzle outlet and a flow stabilizer positioned in the nozzle and configured to collimate the diluent. The flow stabilizer includes a screen assembly including a stacked arrangement of screens. A flood ring may be coupled to the venturi section of the eductor body.

In one embodiment, the venturi section includes a main body having a primary passageway, a venturi body disposed in the primary passageway and including the venturi, wherein a flow path through the venturi section includes a first flow path through a venturi passageway in the venturi and a second flow path through a bypass passageway around the venturi body. A single discharge tube extends from the venturi section of the eductor body for dispensing a solution into a receptacle.

In one embodiment, an air gap eductor system includes the eductor described above and the plurality of nozzle assemblies, each being positionable in the nozzle section and operable with the eductor body, and each corresponding to a different volume flow rate through the eductor. Each of the plurality of nozzle assemblies may be color coded to reflect a specified flow rate.

Further embodiments of the invention are directed to a method of manufacturing an air gap eductor. The method includes providing a nozzle section including an inlet portion and an air gap portion, the inlet portion configured to couple to a diluent source and the air gap portion open to the atmosphere; providing a venturi section including a venturi configured to couple to a chemical source for drawing chemical into the venturi with the flow of diluent through the venturi; and connecting the nozzle section and the venturi section at a swivel joint to form an eductor body.

In one embodiment, providing the nozzle section further includes moulding the nozzle section as a unitary body and providing the venturi section further includes moulding the venturi section as a unitary body. The method may further include inserting a flood ring into the venturi section of the eductor body. In one embodiment, the method further includes selecting a nozzle assembly from a plurality of nozzle assemblies, each of the plurality of nozzle assemblies configured to have a different flow rate, and connecting the selected nozzle assembly to the nozzle section of the eductor body. The method may further include connecting a flow stabilizer to the nozzle assembly, the flow stabilizer configured to collimate the diluent.

BRIEF DESCRIPTION OF THE DRAWING

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 2:
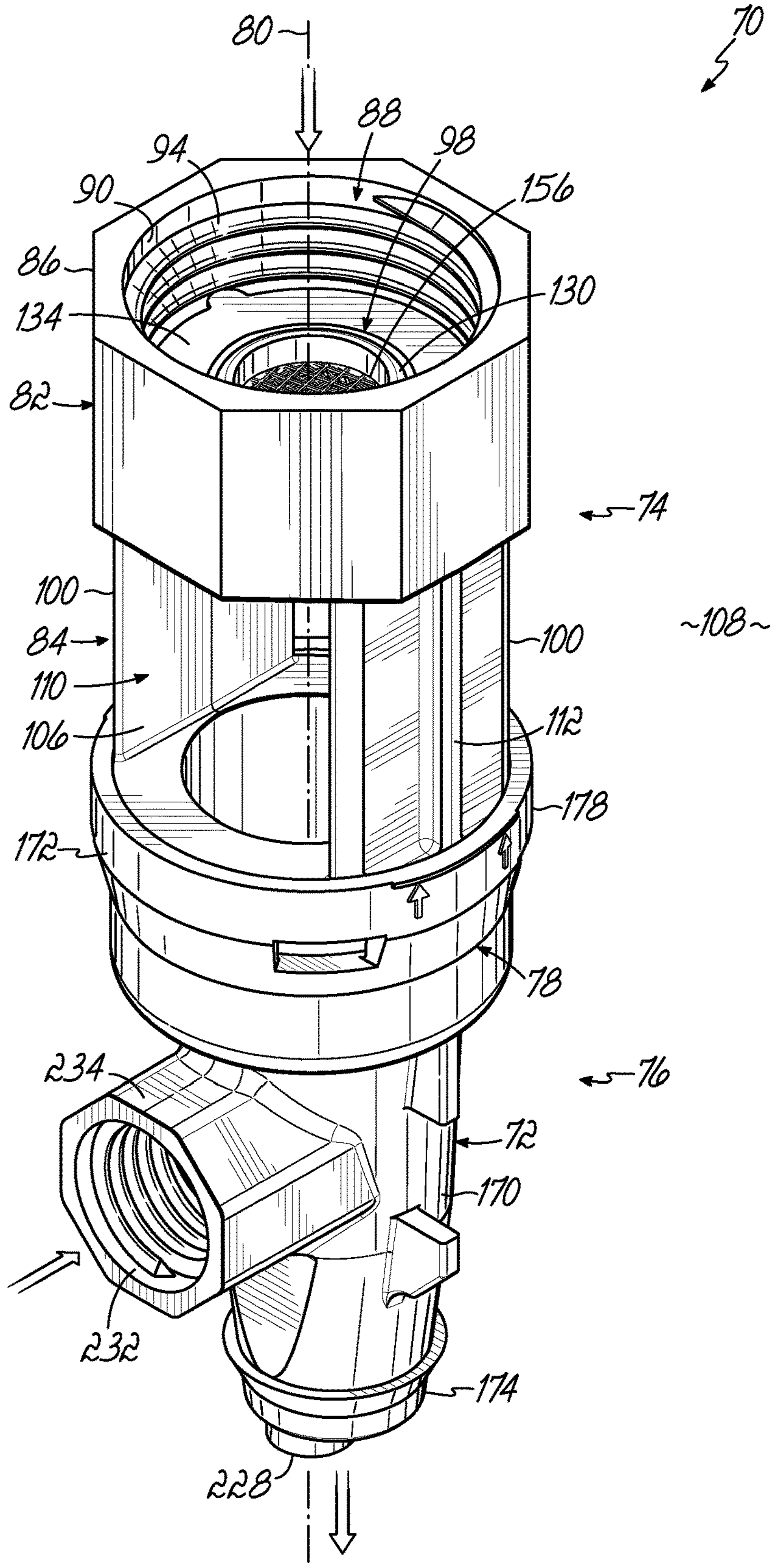
FIG. 2 is an assembled perspective view of an air gap eductor in accordance with an embodiment of the invention.
Figure 3:
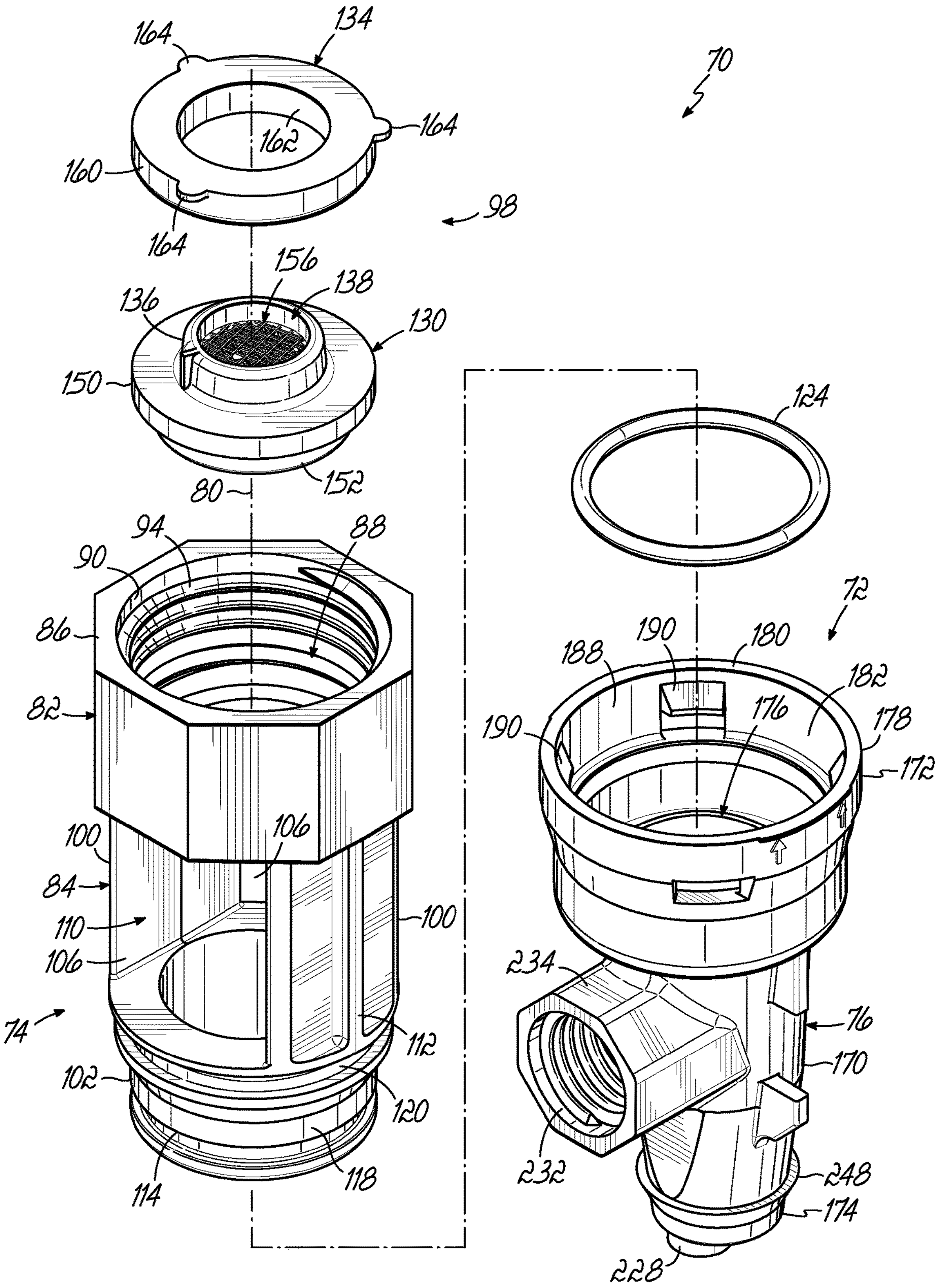
FIG. 3 is a disassembled perspective view of the air gap eductor of FIG. 2.
Figure 4:
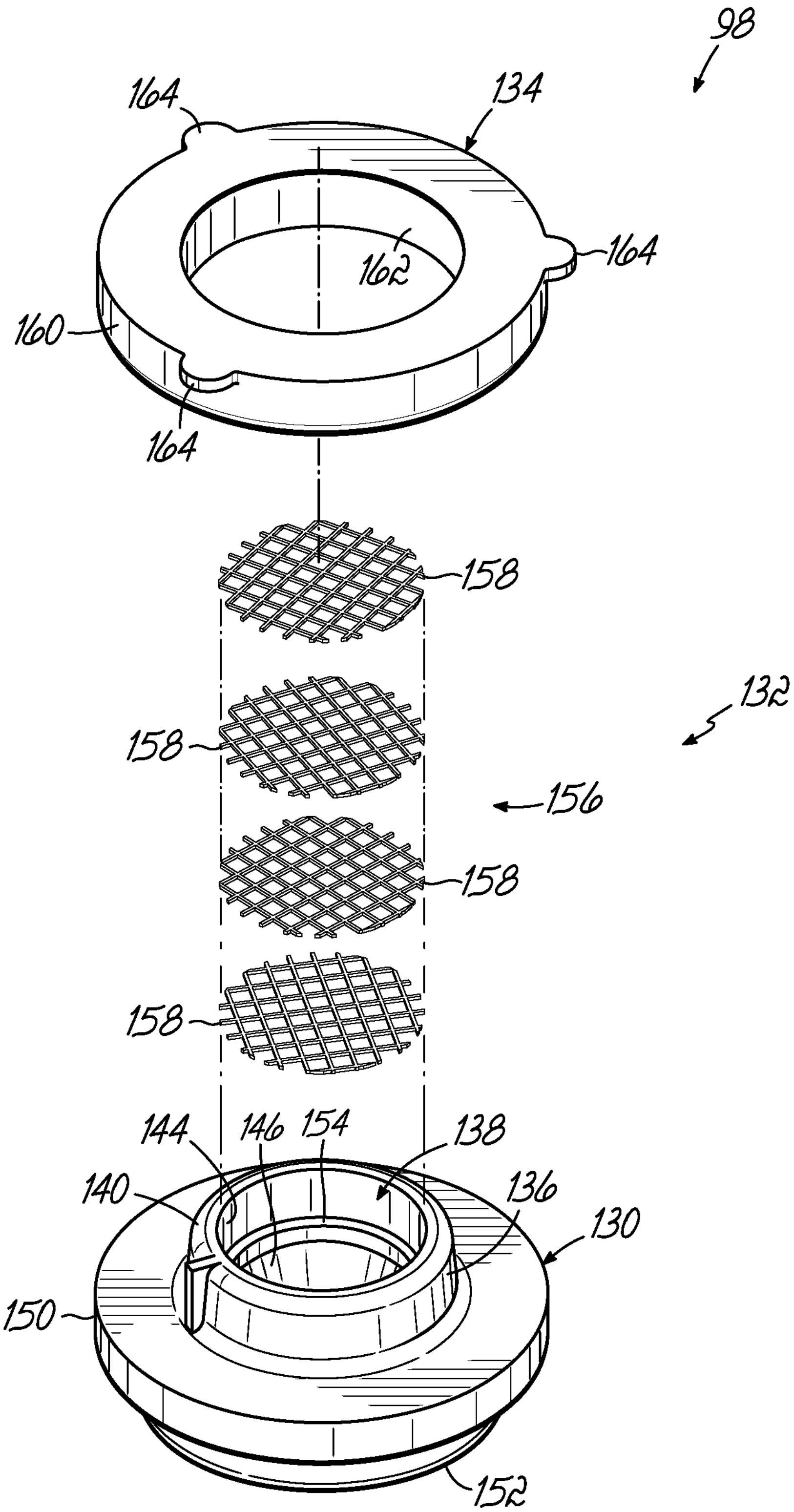
FIG. 4 is a disassembled perspective view of a nozzle assembly in accordance with an embodiment of the invention.
Figure 5:
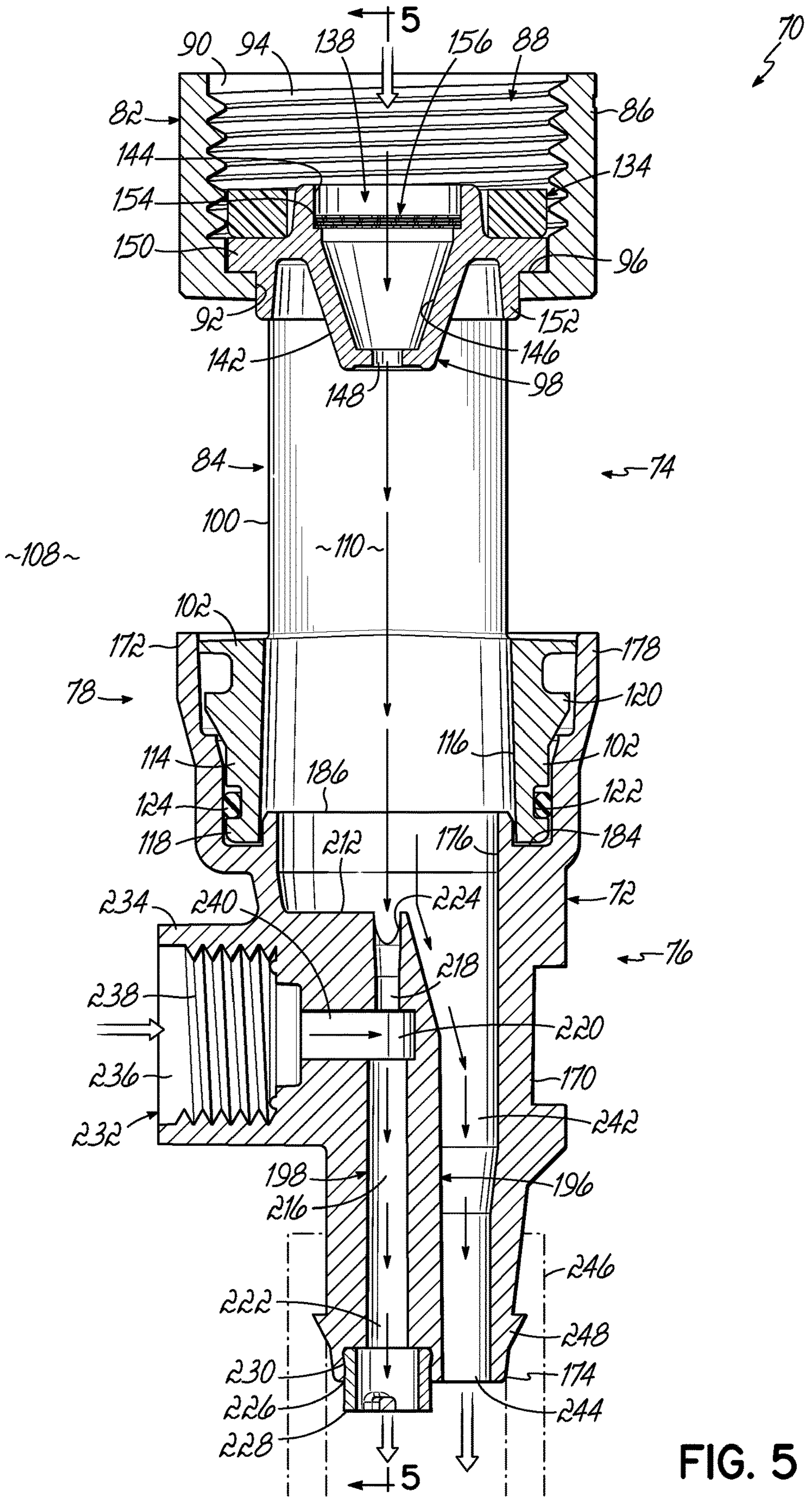
FIG. 5 is a cross-sectional view of the air gap eductor illustrated in FIG. 1.
Figure 6:
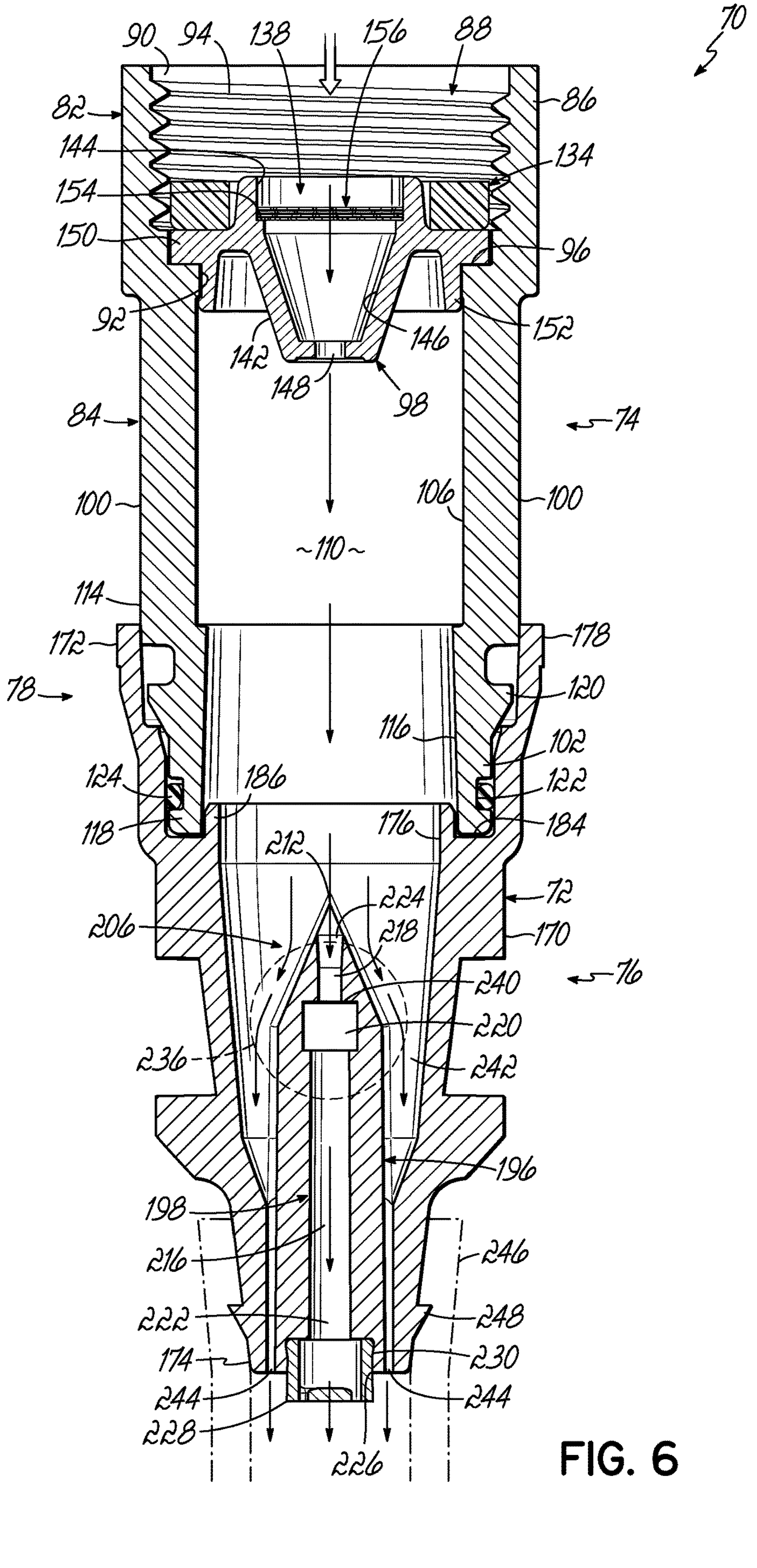
FIG. 6 is another cross-sectional view of the air gap eductor illustrated in FIG. 1.

Referring now to the figures, FIGS. 2 and 3 illustrate an assembled and disassembled view of an improved air gap eductor 70 in accordance with an embodiment of the invention. As will be discussed in more detail below, the air gap eductor 70 has a robust design that addresses many of the challenges of current air gap eductors. The air gap eductor 70 includes an eductor body 72 having a nozzle section 74 and a venturi section 76. In one aspect of the invention, the nozzle section 74 and the venturi section 76 are coupled together at a swivel joint 78 such that the nozzle section 74 and the venturi section 76 are rotatable relative to each other about a central axis 80 of the eductor body 72.

The nozzle section 74 includes an inlet portion 82 and an air gap portion 84. The inlet portion 82 includes a multi-sided (e.g., hexagonal, octagonal, etc.) boss 86 that operates as a female fitting for coupling the air gap eductor 70 to a diluent source, such as a municipal water supply (not shown). The boss 86 includes an internal passageway 88 having an upper portion 90 and a lower portion 92. The upper portion 90 of the passageway 88 includes internal threads 94 for making a threaded connection to, for example, a male connector of the municipal water supply. The lower portion 92 has a diameter smaller than the upper portion 90 to define a ledge or seat 96. As explained in more detail below, the inlet portion 82 of the nozzle section 74 is configured to receive a nozzle assembly 98 in the internal passageway 88 that engages the seat 96.

The air gap portion 84 of the nozzle section 74 includes a pair of opposed struts 100 extending from the lower surface of the boss 86 and terminating at a lower end thereof at an inner swivel hub 102. In one embodiment, the struts 100 may be generally elongate and rectangular in form and the region between adjacent edges 102 of the struts 100 may be open (i.e., lack an associated wall) to define opposed openings or windows 106. In this way, the flow path through air gap portion of the nozzle section 74 is open to the surrounding environment 108 and atmospheric pressure. The windows 106 are also sized to allow visual observation of the diluent stream during operation of the educator 70. A passageway 110 open to the internal passageway 88 in the inlet portion 82 is generally defined between the two opposed struts 100. The struts 100, and more particularly an outer surface thereof, may include one or more ribs 112 to provide added strength and rigidity to the nozzle section 74 of the eductor body 72.

In one embodiment, the inner swivel hub 102 includes a generally cylindrical body 114 having an internal passageway 116 extending therethrough from an upper surface to a lower surface. The upper surface of the body 114 is connected to the lower end of the struts 100 such that the inlet portion 82 of the nozzle section 74 is spaced from the inner swivel hub 102 by the struts 100. The outer side wall 118 of the body 114 includes features that facilitate the swivel connection to the venturi section 76 described below. For example, the outer side wall 118 may include an annular lip 120 projecting from the side wall 118 which is configured to engage with an upper aspect of the venturi section 76 to rotatably connect the nozzle section 74 and venturi section 76 together. The annular lip 120 may include an angled or chamfered lower surface to facilitate the connection between the nozzle section 74 and venturi section 76. The outer side wall 118 may also include one or more seal grooves 122 for receiving a seal, such as an O-ring 124.

In one embodiment, the nozzle section 74 may include separate elements which are subsequently coupled together during assembly of the air gap eductor 70. For example, the boss 86, struts 100, and inner swivel hub 102 may each be manufactured separately and then coupled together, such as through bonding or other process, to form the nozzle section 74. In a preferred embodiment, however, the nozzle section 74 may be a single unitary body (e.g., a monolithic body). By way of example, the nozzle section 74 may be formed through a molding process, such as an injection molding process, using a suitable engineering material. For example, the nozzle section 74 may be formed from an acetal compound such as Celcon®. It should be recognized that other processes and materials are also possible.

As discussed above and illustrated in FIGS. 2-7, the nozzle section 74, and more specifically the inlet portion 82 thereof, is configured to receive the nozzle assembly 98 of the air gap eductor 70. The nozzle assembly 98 is configured to transform the diluent from the diluent supply (e.g., municipal water supply) into a laminar, collimated diluent stream directed toward the venturi section 76 of the eductor 70 and at a specified flow rate. In an exemplary embodiment, the nozzle assembly 98 may include a nozzle 130, a flow stabilizer 132, and optionally a washer 134. The nozzle 130 includes a generally cylindrical body 136 having an internal passageway 138 extending therethrough. The cylindrical body 136 includes an upper portion 140 and a lower portion 142. In one embodiment, the upper portion 140 has a generally constant outer diameter or a slight outwardly or diverging taper and the lower portion 142 has a converging configuration characteristic of a nozzle geometry. The internal passageway 138 similarly includes an upper portion 144 having a generally constant diameter and a lower portion 146 having a converging configuration characteristic of a nozzle geometry. The lower end of the nozzle 130 defines a nozzle outlet 148 open to the internal passageway 138 and through which diluent flowing through the nozzle 130 passes.

The nozzle 130 may further include an annular flange 150 radially extending from the cylindrical body 136. The flange 150 may be intermediate the upper and lower ends of the cylindrical body 136, such as where the body 136 transitions from the upper portion 140 to the lower portion 142. In one embodiment, for example, the flange 150 is more adjacent to the upper end of the nozzle 130 than the lower end. Other locations, including at the upper or lower ends of the cylindrical body 130 may also be possible. The nozzle 130 may further include a longitudinally extending annular projection or nose 152 depending from the lower surface of the radially extending flange 150. The nose 152 is radially located intermediate the cylindrical body 136 and the outer edge of the flange 150. As illustrated in the figures, the annular flange 150 is sized to closely fit (e.g., frictionally fit) within the upper portion 90 of the internal passageway 88 of the inlet portion 82 of the nozzle section 74 and the nose 152 is sized to closely fit within the lower portion 92 of the internal passageway 88 of the inlet portion 82 of the nozzle section 74. Additionally, in one embodiment, the nose 152 extends longitudinally for only a short distance and does not extend to or beyond the nozzle outlet 148. In one embodiment, the nozzle 130 may be formed from a suitable engineering plastic through a molding process. For example, the nozzle 130 may be formed of an acetal compound such as Celcon®.

The flow stabilizer 132 is configured to be received within the internal passageway 138 of the nozzle 130. More particularly, the upper portion 144 of the internal passageway 138 includes a ledge or seat 154 configured to support and engage the flow stabilizer 132. In an exemplary embodiment, the flow stabilizer 132 includes a generally cylindrical screen assembly 156 including a stacked arrangement of generally circular mesh screens 158. Each screen 158 may include a generally orthogonal grid of elongate wires, for example. Adjacent screens 158 in the stack are angularly rotated relative to each other (e.g., 15-20 degrees) so that the wires of the grid are generally not aligned with each other. In one embodiment, the screen assembly 156 may include four screens 158 but the number may vary depending on the particular application. The screens 158 may be formed from stainless steel or other suitable materials, including various anti-corrosion materials.

The washer 134 of the nozzle assembly 98 is configured to retain the nozzle 130 within the inlet portion 82 of the nozzle section 74 and generally includes an annular disk-like body 160 having a central opening 162. The body 160 is sized to be received within the upper portion 90 of the internal passageway 88 of the inlet portion 82 and the central opening 162 is sized to receive the upper portion 140 of the cylindrical body 136 of the nozzle 130 therein. The lower surface of the annular body 160 is configured to be supported by and engage the upper surface of the annular flange 150 of the nozzle 130. The washer 134 may include one or more tabs 164 extending radially from an outer edge thereof, such as adjacent an upper surface of the annular body 160. The tabs 164 are configured to engage beneath the threads 94 of the inlet portion 82 to facilitate retention of the nozzle 130 within the nozzle section 74 of the eductor body 72. In an exemplary embodiment, the washer 134 may be formed from a suitable engineering plastic, such as an engineering elastomer. Other materials may be possible, however.

Turning now to the venturi section 76, this section includes a generally cylindrical main body 170 having an upper end 172, a lower discharge end 174, and a primary passageway 176 extending therebetween. The upper end 172 includes an outer swivel hub 178 configured to rotatably connect to the inner swivel hub 102 at the lower end of the nozzle section 74. The outer swivel hub 178 includes a generally cylindrical body 180 having an opening 182 for receiving the inner swivel hub 102. A lower end of the outer swivel hub 178 includes a recessed annular channel 184 disposed about a projecting nose 186. The recessed annular channel 184 is configured to receive the lower end of the inner swivel hub 102 such that the projecting nose 186 is received in the internal passageway 116 of the inner swivel hub 102 and the primary passageway 176 of the main body 170 is in communication with the passageway 116 of the inner swivel hub 102 (and thus in communication with the passageway 110 and the diluent stream flowing through the nozzle 130).

The inner side wall 188 of the cylindrical body 180 includes features that facilitate the swivel connection to the nozzle section 174 described above. For example, the inner side wall 188 may include one or more tabs 190 projecting from the side wall 188 and configured to engage the annular lip 120 of the inner swivel hub 102 to thereby rotatably connect the nozzle section 74 with the venturi section 76. The tabs 190 may include an angled or chamfered upper surface to facilitate the connection between the inner swivel hub 102 and the outer swivel hub 178. In this regard, as the nozzle section 74 and the venturi section 76 are brought together, the chamfered surfaces of the annular lip 120 and the tabs 190 engage each other and plastically or elastically deform the material such that the tabs 190 lock behind the annular lip 190 in a snap-fit type of connection. This type of connection prevents the nozzle section 74 and the venturi section 76 from being separated from each other (e.g., such as being pulled apart in a direction of central axis 80), but yet allows the two sections 74, 76 to rotate relative to each other about the central axis 80. Furthermore, the inner side wall 188 of the cylindrical body 180 may also include a surface configured to engage with the O-ring 124 carried by the inner swivel hub 102 to thereby form a fluid tight seal between the nozzle section 74 and the venturi section 76.

As illustrated in FIGS. 5, 6 and 8-10, the venturi section 76 includes a venturi body 196 disposed within the primary passageway 176 of the main body 170. The venturi body 196 includes a venturi 198 for introducing chemical into the diluent stream flowing through the air gap eductor 70. The venturi body 196 projects from an inner side wall 200 of the main body 170 and into the passageway 176. In an exemplary embodiment, the venturi body 196 has a generally U-shaped profile including a pair of generally spaced apart planar side walls 202 having a first edge at the inner side wall 200 and a second edge positioned in the primary passageway 176. The second edges of the side walls 202 are connected by an arcuate end wall 204 to provide the U-shaped profile. The upper end of the venturi body 196 includes a tip 206 having a splash-suppressing profile configured to minimize the generation of droplets and mist during operation of the air gap eductor 70. In an exemplary embodiment, the tip 206 includes a pair of generally planar angled or scarfed surfaces 208, 210 at an upper edge of the side walls 202 that meet along a relatively sharp knife edge 212. The tip 206 further includes a third frusto-conical scarfed surface 214 extending from an upper edge of the end wall 204 and further extending between the edges of the scarfed surfaces 208, 210.

Figure 8:
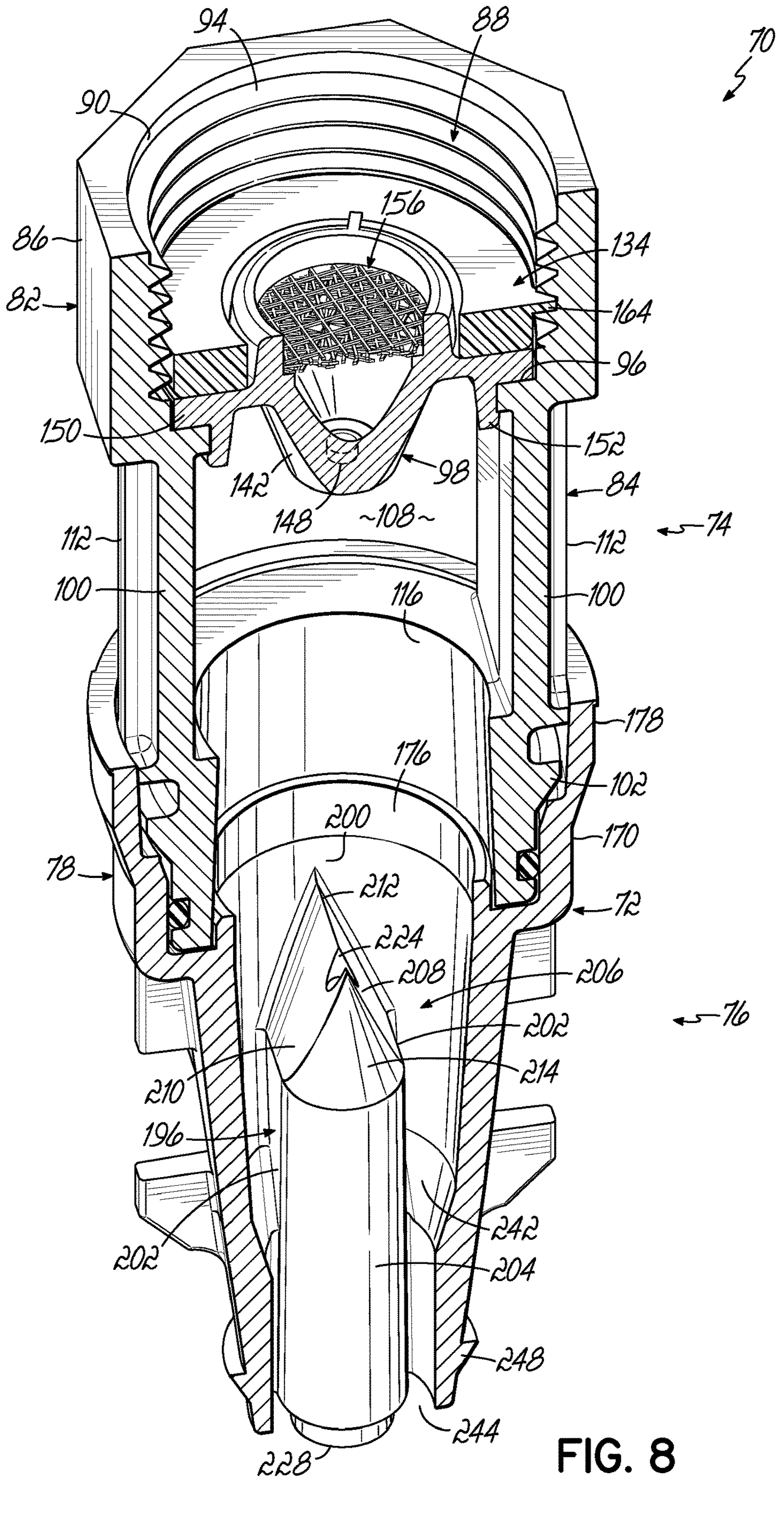
FIG. 8 is a cross-sectional view of the air gap eductor illustrating the venturi configuration.
Figure 9:
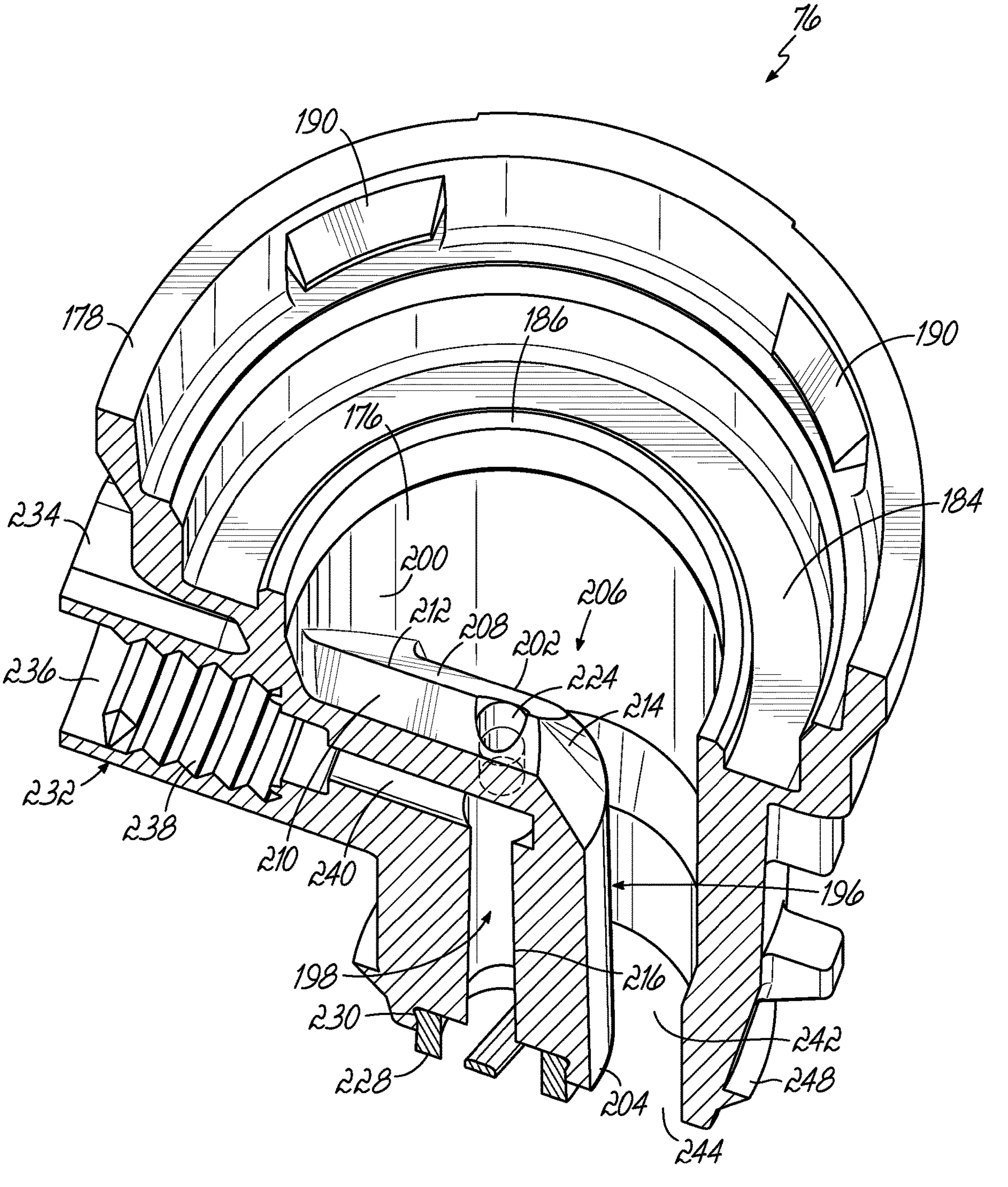
FIG. 9 is another cross-sectional view of the air gap eductor illustrating the venturi configuration.
Figure 10:
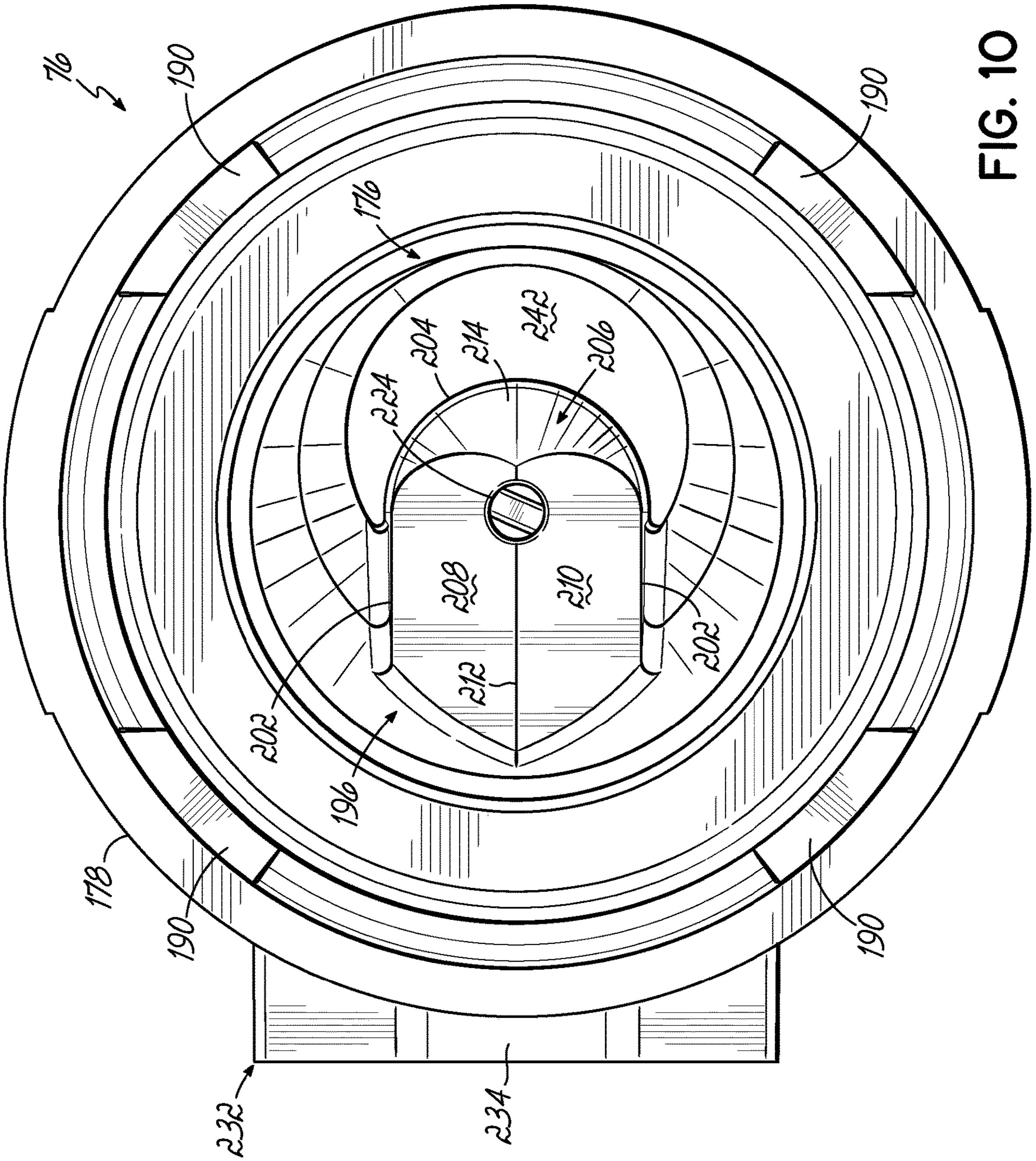
FIG. 10 is a top view of the air gap eductor illustrating the venturi configuration.

As noted above, the venturi body 196 includes the venturi 198 disposed therein. The venturi 198 has a conventional construction, including a venturi passageway 216 having converging/diverging portion 218 to generate a low-pressure region 220 and a discharge portion 222 downstream thereof. The upper end of the venturi passageway 216 defines an opening or orifice 224 in the tip 206 of the venturi body 196 and a discharge outlet 226 at the lower end of the venturi passageway 216. In an exemplary embodiment, the venturi 198 is positioned in the venturi body 96, and the venturi body 96 disposed within the primary passageway 176, such that the venturi passageway 216 generally extends along the central axis 80 of the eductor body 72. In this way, the orifice 224 of the venturi 198 (i.e., the inlet to the venturi 198) is centered relative to the diluent stream from the nozzle 130 of the nozzle assembly 98. In an exemplary embodiment, the tip 206 of the venturi body 196 is arranged such that the knife edge 212 generally bisects the orifice 224 of the venturi 198. Accordingly, and as illustrated in FIGS. 8 and 9, the orifice 224 has a generally U-shaped profile due to the scarfed surfaces 208, 210.

Figure 1:
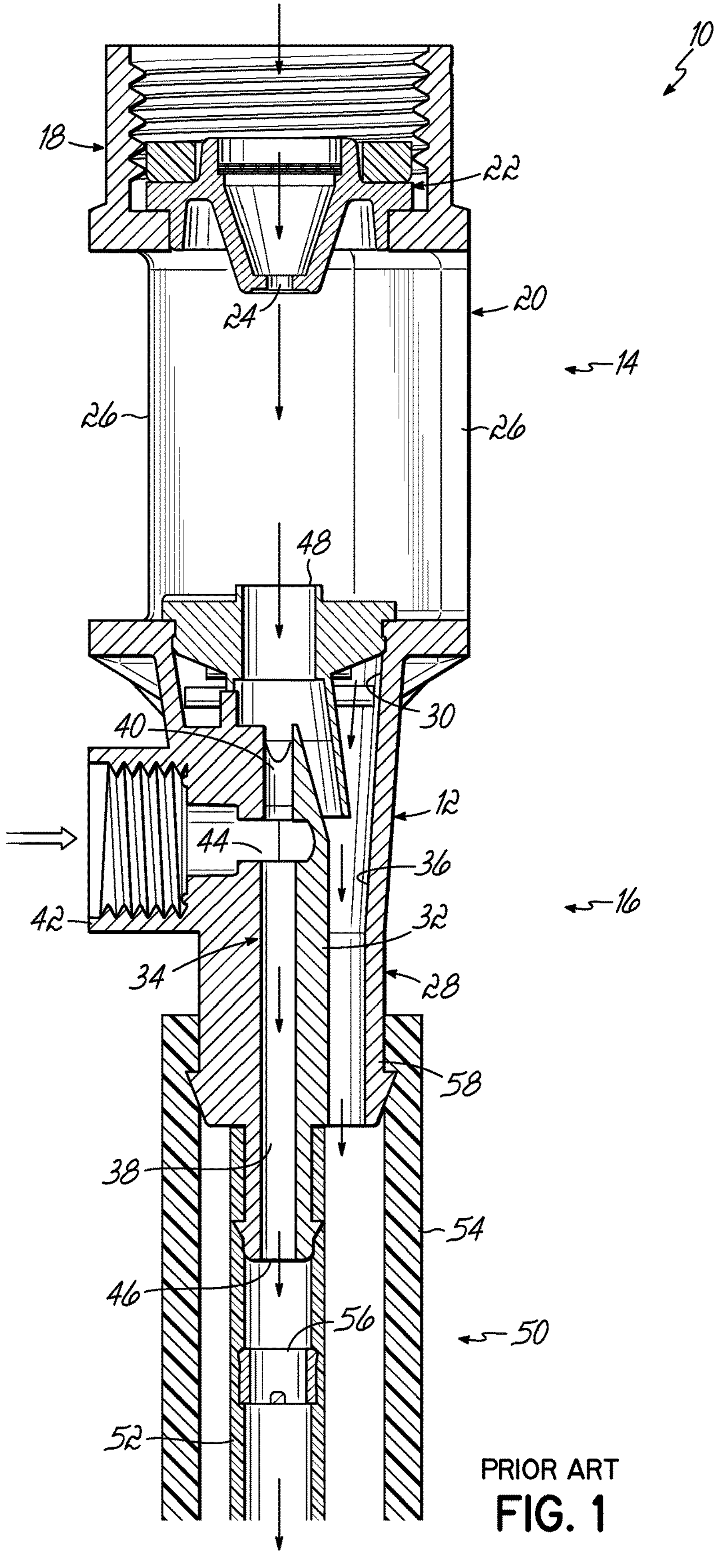
PRIOR ART FIG. 1
FIG. 1 is a cross-sectional view of an air gap eductor according to the prior art.

In accordance with one aspect of the invention, the flood ring of the inner discharge tube in the prior air gap eductors (e.g., see flood ring 56 in inner discharge tube 52 in FIG. 1) has been relocated so as to be integrated into the eductor body 72 of the air gap eductor 72. Among other advantages and as discussed in more detail below, this allows the inner discharge tube to be omitted from the new air gap eductor 70, thereby reducing the number of parts for the eductor 70. In an exemplary embodiment, the flood ring 228 may be positioned within a cavity 230 in the discharge outlet 226 at the lower end of the venturi 198. Though being repositioned to be part of the eductor body 72, the flood ring 228 operates in its known manner to create back pressure that facilitates the proper operation of the venturi 198. Accordingly, further details of the flood ring 228 will not be provided herein.

Intermediate the orifice 224 and the discharge outlet 226 is a chemical port 232 for operatively connecting the air gap eductor 70 to a chemical supply (not shown). The chemical port 232 includes a boss 234 that operates as a female fitting for connecting to the chemical supply which has an internal passageway 236 with internal threads 238 for making a threaded connection. The internal passageway 236 is open to a chemical passage 240 which is in turn open to the venturi passageway 216. More particularly, the chemical passage 240 is open to the low-pressure region 220 of the venturi passageway 216. Thus, as diluent flows through the venturi passageway 216 of the venturi 198, a vacuum is created that draws chemical from the chemical supply through the chemical passage 240 and into the diluent stream, thereby creating a solution having diluent and chemical.

The presence of the venturi body 196 in the primary passageway 176 provides two flow paths through the venturi section 76 of the eductor body 72. One flow path is through the venturi 198 where a portion of the diluent stream from the nozzle assembly 98 enters the venturi passageway 216 through the orifice 224 and leaves through the discharge outlet 226. The venturi body 196, however, does not occupy the entire primary passageway 176, thereby defining a bypass passageway 242 around the venturi body 196. For example, the bypass passageway 242 may be arranged to partially surround the venturi body 196. The bypass passageway 242 includes a discharge outlet 244 at the lower end of the main body 170 of the venturi section 76 and adjacent the discharge outlet 226 of the venturi 198. Thus, it should be appreciated that both the lower discharge end 174 of the main body 170 of the venturi section 76 encompasses both the discharge outlet 226 of the venturi passageway 216 and the discharge outlet 244 of the bypass passageway 242.

In one embodiment, the venturi section 76 may include separate elements which are subsequently coupled together during assembly of the air gap eductor 70. For example, the outer swivel hub 178 and venturi body 196 may each be manufactured separately and then coupled together, such as through bonding or other processes, to form the venturi section 76. In a preferred embodiment, however, the venturi section 76 may be a single unitary body (e.g., monolithic body). By way of example, the venturi section 76 may be formed through a molding process, such as an injection molding process, using a suitable engineering material. For example, the venturi section 76 may be formed from a glass filled polypropylene or other chemically resistant engineering material. It should be recognized that other processes and materials are also possible.

As illustrated in the figures, the air gap eductor 70 further includes a tube assembly for directing the solution flowing from the lower discharge end 174 of the eductor body 72, and more particularly the venturi section 76 thereof, to a receptacle (not shown). Due to the design of the air gap eductor 70, the tube arrangement consists of only a single tube instead of the dual tubes of prior air gap eductors. More particularly, and as noted above, the tube assembly omits the inner discharge tube and only includes an outer discharge tube 246. The outer discharge tube 246 may be conventional and similar to existing outer discharge tubes. The upper end of the outer discharge tube 246 is configured to be connected to the lower discharge end 174 of the eductor body 72, such as with a barb 248.

With the structural aspects of the air gap eductor 70 described above, the assembly of the air gap eductor 70 will now be described. As noted above, in a preferred embodiment, the nozzle section 74 and the venturi section 76 may each be formed as a single unitary body through a molding process. With the nozzle section 74 and the venturi section 76 so formed, the two components may be rotatably coupled together at the swivel joint 78. More particularly, the two components may be moved toward each other such that the inner swivel hub 102 at the lower end of the nozzle section 74 is received in the outer swivel hub 178 at the upper end of the venturi section 76. As the two components are brought together, the chamfered surfaces of the annular lip 120 and the tabs 164 engage each other and plastically or elastically deform one or both of the swivel hubs 102, 178 so that the tabs 164 drop beyond or behind the annular lip 120 in a snap-fit manner to thereby connect the nozzle section 74 and the venturi section 76. Because of the swivel joint 78, the two sections 74, 76 are connected and cannot be pulled apart (such as along the central axis 80) but remain rotatable relative to each other about the central axis 80. While the nozzle section 74 was described as having the inner swivel hub 102 and the venturi section 76 was described as having the outer swivel hub 178, these could be reversed and remain within the scope of the invention.

Figure 7A:
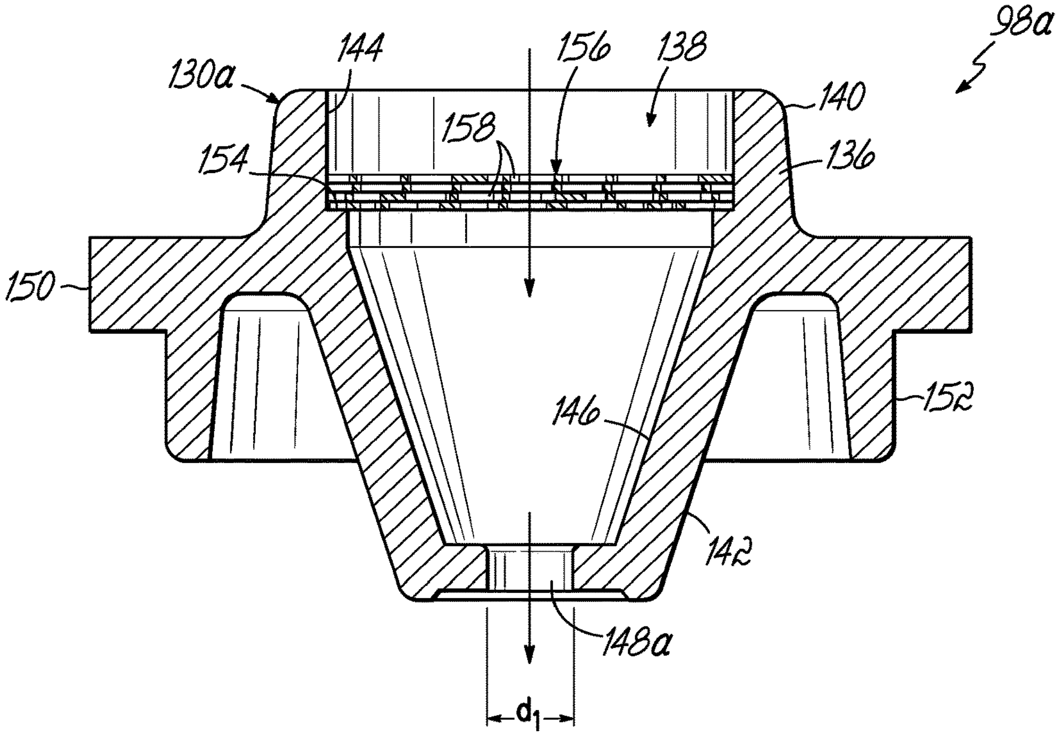
FIGS. 7A and 7B are illustrations of nozzle assemblies in accordance with an embodiment of the invention for two different flow rates.
Figure 7B:
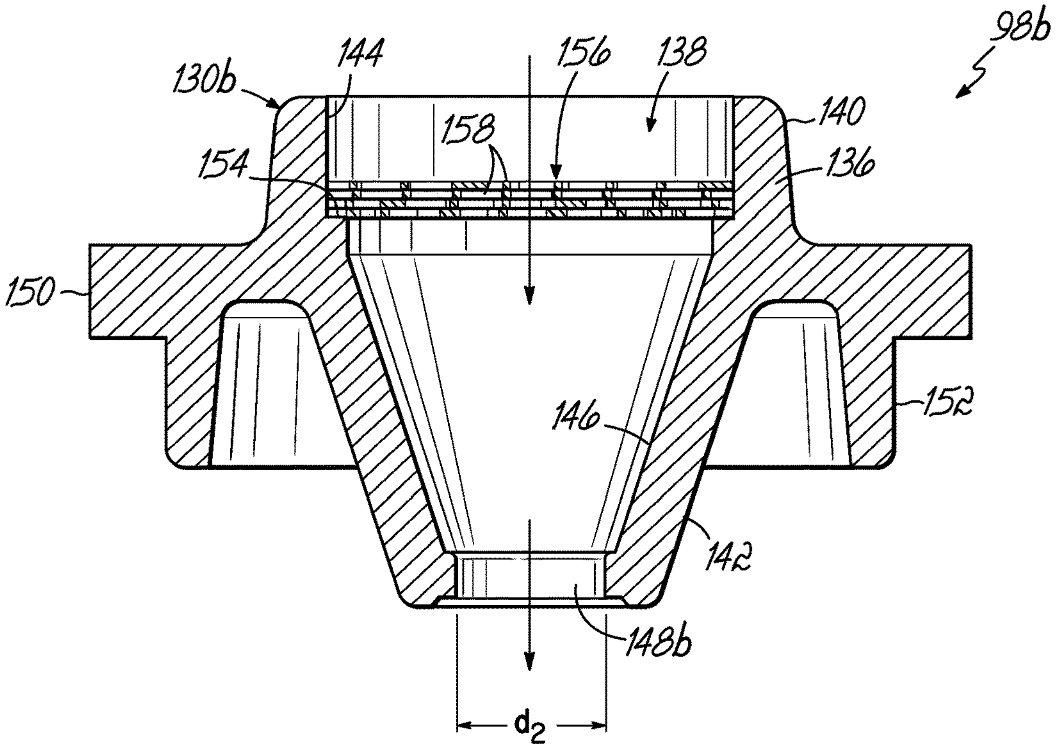

Next, the nozzle assembly 98 for the air gap eductor 70 may be formed. The first step is to select the proper nozzle 130 for the air gap eductor 70. In accordance with an aspect of the invention, the air gap eductor 70 may be configured to operate at multiple flow rates. In one embodiment, the air gap eductor 70 may be configured to operate at two flow rates, e.g., 1 gpm and 2.5 gpm. In a preferred embodiment, however, the air gap eductor may be configured to operate at three different flow rates, e.g., 1 gpm, 2.5 gpm, and 3.5 gpm. The component of the air gap eductor 70 that controls flow rate is the nozzle assembly 98, and more particularly the nozzle 130 thereof. Thus, plurality of nozzles 130 may be provided, one for each flow rate. In an exemplary embodiment, the plurality of nozzles 130 all have the same outer dimensions and are configured to fit within the same eductor body 72. The primary difference between the different nozzles 130 is the size of the nozzle outlet 148, as this is what primarily controls the flow rate. FIGS. 7A and 7B illustrate two different nozzle assembles 98*a*, 98*b* having nozzles 130*a*, 130*b* with different nozzle outlets 148*a*, 148*b*. More particularly, the nozzle outlet 148*b* has a diameter of d2 which is larger than the diameter d1 of the nozzle outlet 148*a* such that the flow rate through nozzle 130*b* is greater than the flow rate through nozzle 130*a*. By way of example, the nozzle 130*a* may correspond to the 1 gpm flow rate and the nozzle 130*b* may correspond to the 2.5 or 3.5 gpm flow rate. Once the appropriate nozzle 130 is selected, the nozzle assembly 98 may be formed by inserting the screen assembly 156 into the upper portion 144 of the internal passageway 138 of the nozzle 130 until the bottom most screen 158 engages the seat 154. In one embodiment, the screens 158 may be inserted one at a time. Alternatively, the screens 158 may be initially stacked and then the stack inserted into the nozzle 130 as a unit.

With the flow rate selected and the screen assembly 156 inserted into the nozzle 130, the nozzle 130 may be inserted into the eductor body 72 of the air gap eductor 70. In this regard, the nozzle 130 (and screen assembly) may be inserted into the upper portion 90 of the internal passageway 88 of the nozzle section 74. The nozzle 130 may be positioned such that the radial flange 150 of the nozzle 130 engages the seat 96 and the nose 152 is disposed in the lower portion 146 of the passageway 138 such as in a friction fit. The washer 134 may then be inserted into the eductor body 72 to secure the nozzle 130 in place. More particularly, the washer 134 may be positioned so as to engage the upper surface of the radial flange 150, thereby having the first portion of the cylindrical body 136 extend through the central opening 162 of the washer 134. The washer 134 may be pressed downwardly to firmly locate the nozzle 130 within the nozzle section 74 of the eductor body 72. Once firmly placed, the tabs 164 may be tucked beneath the internal threads 94 to maintain the nozzle 130 in place within the inlet portion of the nozzle section 74 of the eductor body 72.

Next, the flood ring 228 may be connected to the eductor body 72. More particularly, the flood ring 228 may be inserted into a cavity 230 at the discharge outlet 226 of the venturi passageway 216 in the venturi section 76 of the eductor body 72. The flood ring 228 is the same for the different flow rates of the nozzle 130 discussed above. Lastly, the outer discharge tube 246 may be connected to the eductor body 72. More particularly, the upper end of the outer discharge tube 246 may be connected to the lower discharge end 174 of the main body 170 of the venturi section 76 of the eductor body 72. With the attachment of the outer discharge tube 246, the air gap eductor 70 is assembled and ready to be used in the field. In this regard, the air gap eductor 70 is configured to be coupled to a diluent source, such as a municipal water supply, and the chemical port is configured to be coupled to a chemical supply. By way of example, this may be done in a dedicated location within a facility, such as in a janitorial closet or the like.

In operation, when it is desired to dispense a cleaning solution of some kind, the diluent source is opened (such as at a water valve) such that diluent may freely flow into the air gap eductor 70. The dispensing system may include a pressure regulator upstream of the air gap eductor 70 to control the diluent pressure. As diluent flows into the air gap eductor 70, the diluent stream interacts with the screen assembly 156 to produce a laminar, collimated diluent stream. The transformed diluent stream passes through the nozzle 130 and nozzle outlet 148 at the selected flow rate at which the nozzle 130 is designed. The diluent stream from the nozzle 130 travels through the air gap portion 84 of the nozzle section 74, which is open to the atmosphere by windows 106, through the swivel joint 78 that connects the nozzle section 74 and venturi section 76, and into the primary passageway 176 of the main body 170 of the venturi section 76 of the eductor body 72. The diluent stream travels some distance along the primary passageway 176 and then engages with the tip 206 of the venturi body 196 disposed within the primary passageway 176. Thus, the tip 206 of the venturi body 196 is buried relatively deep within the main body 170. The interaction between the diluent stream and the tip 206 of the venturi body 196 divides the diluent stream. A first portion of the diluent stream passes through the orifice 224 of the venturi 198 and into venturi passageway 216. A second portion of the diluent stream contacts the tip 206 and is diverted into the bypass passageway 242 around the venturi body 196. As noted above, the tip 206 of the venturi body 196 is configured to minimize splashing, mist, and droplet formation due to the contact between the diluent stream and the venturi body 196.

The diluent flow that passes through the orifice 224 is used to draw chemical into the air gap eductor 70. In this regard, the first portion of the diluent stream travels through the converging/diverging venturi passageway 216 and draws in chemical from the chemical supply connected to the chemical port 232. The chemical travels through the chemical passage 240 and is introduced into the diluent flow through the venturi passageway 216 at the low-pressure region 220. The solution of diluent and chemical then travels through the discharge portion 222 of the venturi passageway 216 and through the flood ring 228 at the discharge outlet 226 of the venturi 198. The second portion of the diluent stream plays no role in drawing chemical into the air gap eductor 70 and simply flows around the venturi body 196 to the discharge outlet 244 of the bypass passageway 242. The solution from the discharge outlet 226 of the venturi 198 and the diluent from the discharge outlet 244 of the bypass passageway 242 both flow into the discharge tube 246, where the two flow streams mix together and are ultimately dispensed into the receptacle from the lower end of the discharge tube 246.

The air gap eductor 70 as described above addresses many of the challenges of prior air gap eductors, such as those presented by air gap eductor 10. To fully appreciate the benefits provided by the air gap eductor 70, however, one must understand a fundamental shift in a design concept between the air gap eductor 10 and the air gap eductor 70. More particularly, in air gap eductor 10, the eductor was designed to maximize the amount of chemical that could be drawn into the eductor 10. Metering tips in or attached to the chemical port 232 are then used to restrict the flow of chemical into the eductor 10 as needed to produce a desired dilution. This arrangement maximized the dilution range that could be offered by the eductor 10. For example, in the prior art air gap eductor 10, the dilution (weight of diluent to weight of chemical) range for the flow rate of 1 gpm is between about 2:1 and about 330:1; the dilution range for the flow rate of 2.5 gpm is between about 8:1 and about 930:1; and the dilution range for the flow rate of 3.5 gpm is between about 4:1 and about 1,200:1.

This maximization in dilution range is, in turn, provided by maximizing the amount of the diluent stream from the nozzle 10 that is received in the venturi 34 of the air gap eductor 10. The amount of the diluent stream that is received in the venturi 34 may be characterized by the ratio between the diameters of the nozzle outlet 24 and the orifice 40 (referred to as the "outlet to orifice ratio"). The size of the diluent stream is designed to be larger than the orifice 40 to ensure that diluent enters the venturi 34. However, the outlet to orifice ratio is designed to be close to 1 in order to maximize the amount of the diluent stream that enters the venturi 34. For example, in the prior air gap eductor 10, the outlet to orifice ratio for the flow rate of 1 gpm is approximately 1.1; the outlet to orifice ratio for the flow rate of 2.5 gpm is approximately 1.5; and the outlet to orifice ratio for the flow rate of 3.5 gpm is approximately 1.3.

As discussed above, this design concept results in each venturi 34 being specific to the flow rate of the eductor 10, which in turn requires a dedicated eductor body 12 for each flow rate of the eductor 10. Thus, for an eductor offering of three flow rates, three different eductor bodies 12 have to be manufactured, the challenges of which were described above. Additionally, because such a large percentage of the diluent stream is being used to power the venturi 34, the eductor 10 is highly sensitive to misalignment errors, the challenges of which were discussed above.

However, the inventor has discovered that in the vast majority of applications for air gap eductors (e.g., janitorial applications), the dilution range does not have to be as wide as that provided by prior air gap eductors. More particularly, the industry has been trending away from rich dilutions and toward leaner dilutions. By way of example, the richest dilutions in current applications is about 16:1 and extends to about 1,200:1 or leaner. This dilution range is referred to herein as the "effective dilution range." Thus, for most applications the dilution range is within a band or region that does not require the maximization of the diluent stream to power the venturi. The inventor further discovered that for at least two, and preferable each, of the flow rate offerings of 1 gpm, 2.5 gpm, and 3.5 gpm, the effective dilution range may be achieved using the same exact venturi configuration. Thus, the amount of the diluent stream used to draw in chemical does not need to change to achieve the effective dilution range at these flow rates. Accordingly, the only component of the eductor that needs to change is the nozzle, which changes depending on the selected flow rate (recall that the nozzle outlet primarily determines the flow rate).

As a result of this discovery, an air gap eductor may be provided for multiple flow rates (e.g., 1 gpm, 2.5 gpm, and optionally 3.5 gpm) where the eductor body is identical for each flow rate and the only component that differs is the nozzle that is inserted into the eductor body. This design concept is embodied in the air gap eductor 70 described above. Thus, in accordance with an aspect of the invention, air gap eductor 70 the eductor body 72 may be used across a range of flow rates without change. For this reason, the eductor body 72 may be referred to as a "universal eductor body" since the same eductor body may be used across multiple flow rates, including 1 gpm, 2.5 gpm, and optionally 3.5 gpm. In accordance with a further aspect of the invention, multiple nozzle assemblies 98 may be provided, each being specific to a desired flow rate. In an exemplary embodiment, three nozzle assemblies 98 may be provided corresponding to flow rates of 1 gpm, 2.5 gpm, and 3.5 gpm. For these nozzle assemblies 98, the respective nozzle outlet 148 diameters may be about 0.090 inch (2.29 mm), about 0.154 inch (3.91 mm), and about 0.170 inch (4.32 mm). For a fixed diameter of about 0.072 inch (1.83 mm) for venturi orifice 224, the respective outlet to orifice ratios become 1.25, 2.14, and 2.36. In one embodiment, the nozzle assemblies 98 differ only in the size of the nozzle outlets 148 with most all other aspects being the same. Thus, the various dimensions of the nozzle assemblies 98 are the same and are configured to receive the same size screen assemblies 156 and are configured to be received within the same nozzle section 74 of the universal eductor body 72. Moreover, in one embodiment, the different nozzle assemblies 98 may be color coded to differentiate between the design flow rates of the nozzle assemblies. The eductor bodies 72 may also be color coded according to the different flow rates.

In view of the above, it can be appreciated that air gap eductor 70 provides a number of advantages from a manufacturing perspective. For example, only one eductor body 72 has to be manufactured for a multi-flowrate product offering. In an exemplary embodiment, the nozzle section 74 may be a single unitary molded body and the venturi section 76 may be a single unitary molded body. As described above, those two molded bodies 74, 76 may then be snapped together at the swivel joint 78 and the flood ring 228 may then be inserted into the discharge outlet 226 of the venturi 198. Depending on the particular application, the desired flow rate nozzle assembly 98 may then be selected from a plurality of nozzle assembly 98, each having a different flow rate. The selected nozzle assembly 98 may then be inserted into the nozzle section 74 of the eductor 70. But for the connection of the discharge tube 246, the assembly of the air gap eductor 70 is substantially complete. As can be appreciated, this design moots having multiple mold tools or complicated reconfigurable mold tools for producing dedicated educator bodies for the different flow rates. Operation and maintenance of the mold tools are also reduced and simplified with the present invention.

Figure 11A:
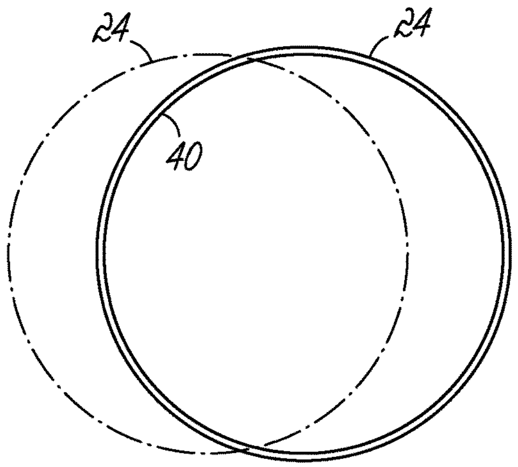
PRIOR ART FIG. 11A
FIGS. 11A-11C are schematic illustrations of the nozzle outlet and orifice illustrating aspects of the present invention.
Figure 11B:
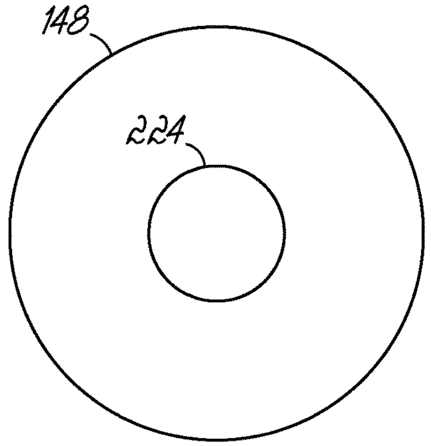
Figure 11C:
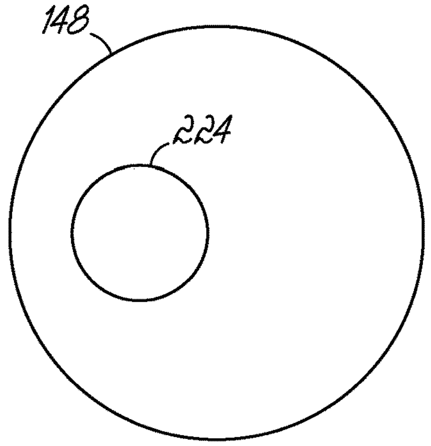

This change in design concept also improves the sensitivity of the air gap eductor to small misalignments between the nozzle 130 of the nozzle assembly 98, and more particularly the nozzle outlet 148 thereof, and the orifice 224 of the venturi 198 in the venturi body 196. FIGS. 11A-11C schematically illustrate the shift in design concept between air gap eductor 10 and air gap eductor 70 and how that design change improves alignment sensitivity. FIG. 11A schematically illustrates the nozzle outlet 24 of the nozzle 22 and the orifice 40 of the venturi 34 for air gap eductor 10. As discussed above, the size of the orifice 40 is selected to be just slightly smaller than the size of the nozzle outlet 24 in order to maximize the diluent stream that powers the venturi 34. As one can appreciate, small misalignments between the nozzle outlet 24 and the orifice 40 (shown in phantom) may impact the operation of the venturi 34. FIG. 11B schematically illustrates the nozzle outlet 148 of the nozzle 130 and the orifice 224 of the venturi 198 for air gap eductor 70. It may readily be seen that the amount of the diluent stream being used to power the venturi 198 has been appreciably decreased. This decrease in size between the nozzle outlet 148 and the orifice 224 is a result of designing venturi 198 to the effective dilution range instead of a maximum dilution range. FIG. 11C illustrates an arrangement where there is a small misalignment between the nozzle outlet 148 and the orifice 224 of the venturi 198. It may readily be seen that even with a misalignment, the orifice 224 of the venturi 198 remains within the confines of the diluent stream. Accordingly, operation and performance of the venturi 198 is not negatively impacted even with the misalignment. Thus, the air gap eductor 70 is more robust and less sensitive to misalignments as compared to air gap eductor 10.

The reduced sensitivity of the air gap eductor to misalignments provides additional benefits. For example, the relative positioning of the nozzle and the venturi does not have to be so rigidly fixed, as was the case for air gap eductor 10. Accordingly, the design of air gap eductor 70 allows for some relative movement between the nozzle assembly 98 and the venturi 198. More particularly, because of the reduced sensitively to misalignments, the nozzle section 74 is permitted to rotate relative to the venturi section 76 about the central axis 80 without negatively impacting the operation and performance of the eductor 70. This, in turn, allows the chemical port 232 of air gap eductor 70 to be reoriented as needed to mate with the chemical conduits that supply the chemical to the eductor 70. Thus, the need to over or under tighten the eductor to the diluent source, for example, has been obviated with the design of air gap eductor 70.

Because the air gap eductor 70 uses the same eductor body 72 (and size of venturi 198 and orifice 224) for multiple flow rates, for higher flow rates, more and more diluent is expected to contact the tip 206 of the venturi body 196 and be diverted into the bypass passageway 242. Thus, there is a possibility of increased splashing and inadvertent leakage of diluent from the air gap eductor 70. This possibility, however, is minimized in the design of the air gap eductor 70 by locating the tip 206 of the venturi body 198 deeper within the venturi section 76 of the eductor body 72. Accordingly, the distance that droplets and mist have to travel to reach a window 106 in the air gap portion 84 of the nozzle section 74 has been significantly increased compared to that shown for air gap eductor 10, where the shield 48 is immediately adjacent to the windows 26 in the eductor body 12. Thus, the likelihood of spitting from the air gap eductor 70 has been significantly decreased in the current design.

The air gap eductor 70 may provide additional benefits as well. For example, the air gap eductor 70 has fewer parts. In particular, by incorporating the flood ring into the eductor body, the inner discharge tube 52 of air gap eductor 10 may be totally eliminated from the design. The elimination of a part is of itself an improvement in the design. There are, however, other benefits. In this regard, when installing air gap eductor 10 many service technicians would forget to attach the inner discharge tube 52 to the discharge outlet of the venturi 34 and only attach the outer discharge tube 54. Without the inner discharge tube 52, the venturi 34 would not operate properly leading to poor performance of the eductor 10 and improperly dosed cleaning solutions. Accordingly, manufacturers started shipping the eductors 10 with the inner discharge tube 52 assembled onto the eductor body 12. This, however, increased the size of the packaging of the eductor 10, thereby increasing the overall costs of the product. Because the air gap eductor 70 omits an inner discharge tube and locates the flood ring 228 on the eductor body 72 itself, the eductor 70 has a relatively compact design that may be easily and cost-effectively packaged. Additionally, the possibility of omitting the flood ring resulting in poor performance is avoided.

In a related advantage, because the venturi 198 of the eductor body 72 is the same for multiple flow rates, the air gap eductor 70 includes only one size of discharge tube 246 for the different flow rates. That size of tubing, for example, may be a standard size and readily available at most facilities, which makes installation and maintenance relatively easy and cost effective. Moreover, the size of the discharge tube 246 may also be configured to fit within the receptacle (e.g., the mouth of a spray bottle) even at the highest offered flow rate (e.g., 3.5 gpm). This is not the case of air gap eductor 10, which has different sized outer discharge tubes 54 depending on the flow rate, and an outer discharge tube 54 that does not fit within a standard spray bottle at 3.5 gpm.

While it is preferable that the eductor body 72 be the same for each of the desired flow rates, aspects of the invention are not so limited. In one embodiment, the eductor body 72 may be the same for multiple flow rates, but less than all of the desired flow rates. For example, the eductor body 72 for the larges flow rate of 3.5 gpm may be slightly modified to increase the diameter of the orifice 224 of the venturi 198. The area of the bypass passageway 242 may also be slightly increased. In such an embodiment, however, the outlet to orifice ratio may still be about 1.75, which is large enough to provide robust operation will permitting misalignments between the nozzle assembly 98 and the venturi 98 (e.g., see FIGS. 11A-11C). Thus, the swivel joint 78 between the nozzle section 74 and the venturi section 76 may still be used. Moreover, the outlet end of the eductor body 72 may be the same such that the same size discharge tube 246 may be used for all of the different flow rates. Thus, the universality of the eductor body 72 is not necessary to achieve certain advantages in accordance with aspects of the invention.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. An eductor for mixing a diluent with a chemical, comprising:

an eductor body, comprising:

a nozzle section having an inlet portion and an air gap portion, the inlet portion configured to couple to a diluent source and the air gap portion open to the atmosphere; and a venturi section coupled to the nozzle section, the venturi section including a venturi configured to couple to a chemical source for drawing chemical into the venturi with flow of diluent through the venturi, the venturi having a cavity formed at a discharge outlet of the venturi, the cavity being disposed within a lower end of the venturi;

a flood ring positioned within the cavity at the lower end of the venturi; and a nozzle assembly positioned in the nozzle section of the eductor body, wherein the nozzle assembly is selected from a plurality of nozzle assemblies each configured to be positioned in the nozzle section and operable with the eductor body, wherein each of the plurality of nozzle assemblies corresponds to a different volume flow rate through the eductor, and wherein the nozzle section and the venturi section of the eductor body are rotatably coupled by a swivel joint.

2. The eductor of claim 1, wherein at least one of the nozzle section and the venturi section is formed as a unitary body.

3. The eductor of claim 1, wherein the nozzle assembly comprises:

a nozzle defining a nozzle outlet; and a flow stabilizer positioned in the nozzle and configured to collimate the diluent.

4. The eductor of claim 3, wherein the flow stabilizer includes a screen assembly comprising a stacked arrangement of screens.

5. The eductor of claim 1, wherein the venturi section comprises:

a main body having a primary passageway;

a venturi body disposed in the primary passageway and including the venturi, wherein a flow path through the venturi section includes a first flow path through a venturi passageway in the venturi and a second flow path through a bypass passageway around the venturi body.

6. The eductor of claim 1, further comprising a single discharge tube extending from the venturi section of the eductor body.

7. An air gap eductor system, comprising:

the eductor of claim 1; and the plurality of nozzle assemblies, each being positionable in the nozzle section and operable with the eductor body, and each corresponding to a different volume flow rate through the eductor.

8. The air gap eductor system of claim 7, wherein each of the plurality of nozzle assemblies is color coded to reflect a specified flow rate.

9. The eductor of claim 1, wherein the swivel joint comprises one or more tabs projecting from a sidewall of the nozzle section engaging an annular lip of the venturi section.

10. An air gap eductor for mixing a diluent with a chemical, the air gap eductor comprising:

an eductor body, comprising:

a nozzle section having an inlet portion and an air gap portion, the inlet portion configured to couple to a diluent source and the air gap portion open to the atmosphere; and a venturi section coupled to the nozzle section, the venturi section including a venturi body projecting from an inner side wall of the venturi section into a primary passageway of the venturi section, the venturi body including a venturi configured to couple to a chemical source for drawing chemical into the venturi with flow of diluent through the venturi, the venturi body having a cavity formed at a discharge outlet of the venturi, the cavity being disposed within a lower end of the venturi;

a flood ring positioned within the cavity at the lower end of the venturi; and wherein the nozzle section is configured to receive a nozzle assembly selected from a plurality of nozzle assemblies, each nozzle assembly operable with the venturi and corresponding to a different volume flow rate through the eductor, wherein the venturi section is rotatably coupled to the nozzle section by a swivel joint.

11. The air gap eductor of claim 10, wherein at least one of the nozzle section and the venturi section is formed as a unitary body.

12. The air gap eductor of claim 10, wherein the nozzle assembly comprises:

a nozzle defining a nozzle outlet; and a flow stabilizer positioned in the nozzle and configured to collimate the diluent.

13. The air gap eductor of claim 12, wherein the flow stabilizer includes a screen assembly comprising a stacked arrangement of screens.

14. The air gap eductor of claim 10, wherein a flow path through the venturi section includes a first flow path through a venturi passageway in the venturi and a second flow path through a bypass passageway around the venturi body.

15. The air gap eductor of claim 10, further comprising a single discharge tube extending from the venturi section of the eductor body.

16. An eductor for mixing a diluent with a chemical, the eductor comprising:

an eductor body, comprising:

a nozzle section having an inlet portion and an air gap portion, the inlet portion configured to couple to a diluent source and the air gap portion open to the atmosphere; and a venturi section coupled to the nozzle section, the venturi section including a venturi body projecting from an inner side wall of the venturi section into a primary passageway of the venturi section, the venturi body including a venturi configured to couple to a chemical source for drawing chemical into the venturi with flow of diluent through the venturi, the cavity being disposed within a lower end of the venturi;

a flood ring positioned within the cavity at the lower end of the venturi; and a nozzle assembly positioned in the nozzle section of the eductor body, wherein the nozzle assembly is selected from a plurality of nozzle assemblies, each nozzle assembly is configured to be received by the nozzle section and corresponds to a different volume flow rate through the eductor;

wherein the venturi section is coupled to the nozzle section by a means for rotating.

17. The eductor of claim 16, wherein the means for rotating comprises a swivel joint.

* * * * *